(12) United States Patent
Greicar

(10) Patent No.: US 6,728,853 B1
(45) Date of Patent: Apr. 27, 2004

(54) METHOD OF PROCESSING DATA UTILIZING QUEUE ENTRY

(75) Inventor: Richard K. Greicar, Moss Beach, CA (US)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 09/678,858

(22) Filed: Oct. 2, 2000

Related U.S. Application Data (60) Provisional application No. 60/170,668, filed on Dec. 14, 1999, and provisional application No. 60/170,607, filed on Dec. 14, 1999.

(51) Int. Cl.[7] .............................................. G06F 13/00
(52) U.S. Cl. ......................... 711/170; 710/22; 712/32
(58) Field of Search .................. 710/22–29; 712/32–43, 712/205–207; 711/170–173

(56) References Cited

U.S. PATENT DOCUMENTS

| | | | | |
|---|---|---|---|---|
| 3,596,257 A | | 7/1971 | Patel ........................ 340/172.5 |
| 3,753,239 A | | 8/1973 | Lindsey et al. ........... 340/172.5 |
| 4,084,224 A | | 4/1978 | Appell et al. ................. 364/200 |
| 4,888,691 A | * | 12/1989 | George et al. ................. 714/15 |
| RE34,850 E | * | 2/1995 | Murakami et al. ............. 712/33 |
| 5,465,361 A | * | 11/1995 | Hoenninger, III ........... 395/710 |
| 5,499,348 A | * | 3/1996 | Araki et al. ................. 712/207 |
| 5,561,786 A | | 10/1996 | Morse .................... 395/497.01 |
| 5,625,840 A | * | 4/1997 | Numata et al. ................. 710/5 |
| 5,685,005 A | * | 11/1997 | Garde et al. .................... 712/36 |
| 5,765,025 A | * | 6/1998 | Morimoto et al. ............. 710/23 |
| 5,835,788 A | * | 11/1998 | Blumer et al. ................. 710/23 |
| 5,968,143 A | * | 10/1999 | Chisholm et al. ............. 710/23 |
| 6,058,474 A | * | 5/2000 | Baltz et al. ..................... 713/1 |
| 6,097,499 A | * | 8/2000 | Casey et al. ................ 358/1.16 |
| 6,161,169 A | | 12/2000 | Cheng ......................... 711/150 |
| 6,170,049 B1 | * | 1/2001 | So ................................ 712/35 |
| 6,175,900 B1 | | 1/2001 | Forin et al. .................. 711/156 |
| 6,182,203 B1 | * | 1/2001 | Simar, Jr. et al. ............. 712/22 |

* cited by examiner

Primary Examiner—Maria N. Von Buhr
(74) Attorney, Agent, or Firm—Beyer Weaver & Thomas LLP (57) ABSTRACT

A processor having a limited amount of local memory for storing code and/or data utilizes a program stored in external memory. The program stored in external memory is configured into blocks which can be loaded individually into the local memory for execution. Queuing the individual blocks of code allows the program to be executed by the processor and also facilitates loading of the subsequent code to be executed. A semaphore system can be utilized to indicate which blocks of local memory are available/unavailable. A group of transfer parameters as queue entries allow code and data for an algorithm to be transferred between both local and external memory.

3 Claims, 7 Drawing Sheets

METHOD OF PROCESSING DATA UTILIZING QUEUE ENTRY

CROSS-REFERENCES TO RELATED APPLICATIONS

This application claims the benefit of U.S. application No. 60/170,668 filed Dec. 14, 1999 entitled "Multi-Component Decoding" and U.S. application No. 60/170,607 filed Dec. 14, 1999 entitled "Method of Processing Data," which are both hereby incorporated by reference.

BACKGROUND

This invention relates generally to the implementation of complex computations in an environment that has limited storage and execution resources. More particularly, this invention relates to transferring data from external memory to a local memory of a processor.

In certain areas of computing, for example in the audio/video field, complex algorithms must often be performed to decompress and manipulate audio and video data so that the data can be broadcast in real time. In the use of MPEG protocols to transmit data, for example, header information is removed from the payload data before the payload data can be displayed or played. Similarly, where the data is compressed, the data must be decompressed so that it can be put to use. A variety of other processes are similarly performed on the data in order to manipulate it.

In a processor with limited resources, however, this manipulation is often difficult to achieve in a time efficient manner. Namely, a processor with a limited local memory can only store a small amount of code to be executed and its accompanying data. Hence, a complete application program typically cannot be loaded into the local memory all at once. Therefore, there is a need for a system that can load code into the processor's local memory in an efficient manner while the existing code resident in the processor is being executed.

Another drawback created by a small local memory is the start and stop nature of loading code into the local memory. Only a small amount of code can be stored by the small local memory. Hence, space in local memory typically must become available before it can be refilled with unexecuted code. Furthermore, the code that is being used to refill the space typically should be loaded by the time the remaining code finishes execution in order to achieve maximum efficiency. Thus, there is a tradeoff between waiting for enough space in local memory to become available and completely loading a space of local memory by the time the previous code has finished loading. Consequently, there is a need for a system that allows a transfer of data to be estimated such that the transfer of code from external memory to internal memory can be completed by the time the resident code completes execution.

SUMMARY

One embodiment of the invention provides a method of processing data by executing a program in a local memory of a processor; accessing a queue of transfer parameters; and storing the transfer parameters in a portion of the local memory of the processor to facilitate a transfer of code or data. This method can be implemented by code which is operable to accomplish these acts.

Another embodiment of the invention provides a method of transferring data from an external memory to a local memory by determining an initial size of data block to be transferred from external memory to local memory of a processor; determining an optimum size for a uniform data block to be transferred from external memory to local memory of a processor; and determining a total number of data blocks to be transferred. Again, the method can be implemented by code which is operable to accomplish these acts.

Yet another embodiment of the invention provides a method of transferring data to a local memory of a processor in an efficient manner by implementing an application program to be run by a processor; initiating a transfer of data from an external memory to a processor; executing a portion of an application program; and determining that data has been transferred from external memory to the processor by utilizing a proportional relationship between the application program speed and the transfer of data speed. Code can be utilized which is operable to accomplish these acts.

These and other embodiments of the invention can be implemented in a variety of formats. This could include at least an actual integrated circuit, a core for insertion within an application specific integrated circuit (ASIC), as well as computer code that can wholly or partly describe (for such purposes as modeling or semiconductor manufacturing), the apparatus and/or method.

Other and further features of the invention will be apparent to those skilled in the art from a consideration of the following description taken in conjunction with the accompanying drawings wherein certain methods of and apparatuses for practicing the invention are illustrated. However, it is to be understood that the invention is not limited to the details disclosed but includes all such variations and modifications as fall within the spirit of the invention and the scope of the appended claims.

DESCRIPTION

Figure 1:
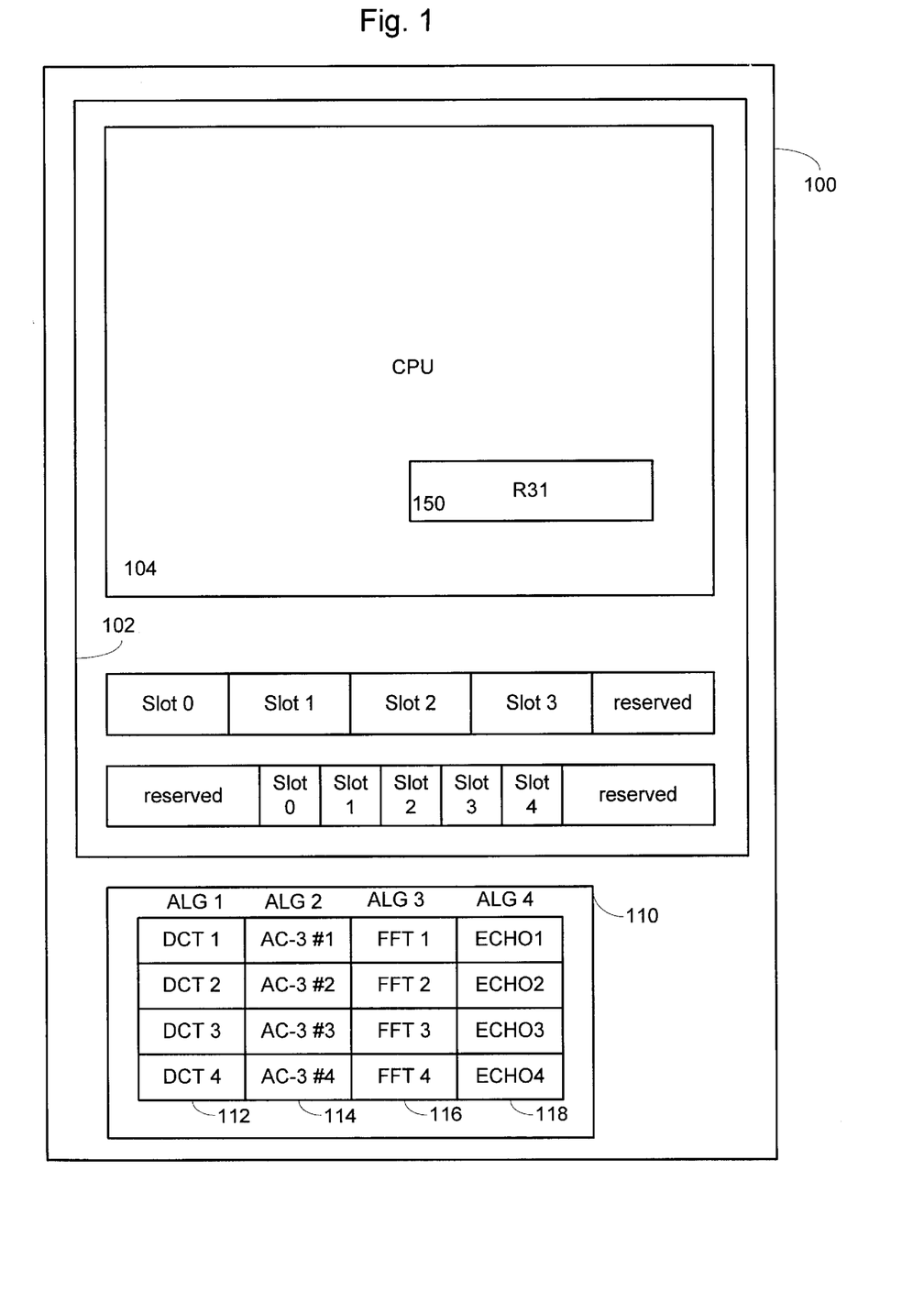
FIG. 1 shows a block diagram of a consumer device having a processor with local memory divided into blocks of memory as well as reserved memory.

Referring now to the figures and more particularly to FIG. 1 an apparatus for one embodiment of the invention can be seen. FIG. 1 is shown as a common consumer electronic device 100, such as a set-top box which receives audio and video data from a cable company. It could easily be any device which accepts audio or video data, such as a DVD program, from a source. The set-top box shown in FIG. 1 utilizes a processor 102 and external memory 110. The external memory can be SDRAM or alternative types of memory as would be understood by those of ordinary skill in the art. The processor 102 is shown as having a CPU 104 and local memory 106 and 108. Local memory is memory that is actually part of the processor rather than being separate from the processor. Hence, the access time is significantly faster. In many cases, the local memory is the only memory available to the CPU without extra hardware assistance, such as a direct memory access (DMA).

The local memory blocks 106 and 108 in FIG. 1 are shown as divided into sections or "slots". Local memory 106 is preferably 8 kilobytes in size, but larger or smaller sizes could be used. In FIG. 1, half of this memory is utilized for loading code stored externally from the processor 102. The remaining half is reserved so that the support code can be stored there. Similarly, local memory block 108 is shown as approximately 8 kilobytes in size. Three kilobytes of the local memory block 108 are held in reserve for the invention's variable storage while 5 kilobytes are used to store data. The portions of memory blocks 106 and 108 that are used for code and data respectively are partitioned or segmented into units. Hence, local memory block 106 is considered to have 4 "slots" or units of memory of 1 kilobyte in size. Similarly, local memory block 108 is considered to have 5 "slots" or units of memory of 1 kilobyte in size. Note that the invention can operate with different slot counts and sizes; hence block 106 could have 8 blocks of size 512 bytes, for example. The local memory blocks 106 1 and 108 are accessible by the CPU 104 of the processor via a bus (not shown). A register 150, designated as "R31" is shown as part of CPU 104. Such a register can be utilized to store a flag or "semaphore." Individual bit locations of the register can be associated with the code and data segments in local memory 106 and 108. In this way, different routines keep track of whether a slot of local memory is occupied, being loaded, available for loading new code or data, etc. In addition, CPU registers, such as R31, can be accessed more rapidly than RAM.

FIG. 1 also shows an external memory 110, i.e., memory separate from the processor. External memory 110 is preferably synchronized dynamic random access memory (SDRAM) coupled to processor 102. However, it is envisioned that this external memory could take the form of other memory devices as well. Furthermore, while the memory is shown as being located within electronic device 100, in some embodiments it might be preferable to locate it external from such a device. External memory 110 is shown storing code for several algorithms. Namely, a Discrete Cosine Transform (DCT) algorithm is shown stored in a memory block 112 as divided into 4 segments of code, DCT1, DCT2, DCT3, and DCT4. Similarly, an AC-3 routine is shown stored in memory block 114 as code segments AC-3 #1, AC-3 #2, AC-3 #3, and AC-3 #4. Memory blocks 116 and 118 are shown storing code for Fast Fourier Transform (FFT) and an Echo special effects algorithm, respectively. For example, while the code stored in memory 112 would normally be considered just a DCT routine, it is segmented into four segments or blocks so that each block can fit into the limited memory capacity of processor 102, namely into the available slots of local memory 106 and 108 depending on whether code or data is being transferred, respectively. FIG. 1 also shows two representative queues in local memory 108. These two exemplary queues each have four queue entries for coordinating the loading of local memory with the code of the various algorithms. A separate queue can exist in local memory 108 for each different transfer algorithm. For example, a single transfer queue can be assigned to bus transfer control units, such as DMA, that the processor 100 supports. If there is more than one transfer bus, it is useful to assign a queue to each.

A queue stored in local memory can be made up of the first few entries of an algorithm. Thus, for example, a queue could implement the DCT routine followed by the FFT routine, followed by the Echo Routine. Each entry could comprise identifying parameters of a block of the DCT Routine. These entries would be followed by entries for the beginning of the FFT and Echo routines. Thus, after the first identifying entry of a routine is accessed, the routine can become self-loading by having that entry point to an entry for a subsequent block. When no blocks in a routine remain, the pointer to the next routine's first entry (e.g., the FFT routine's first entry) can be accessed. Then, the process is repeated for that routine.

Figure 2:
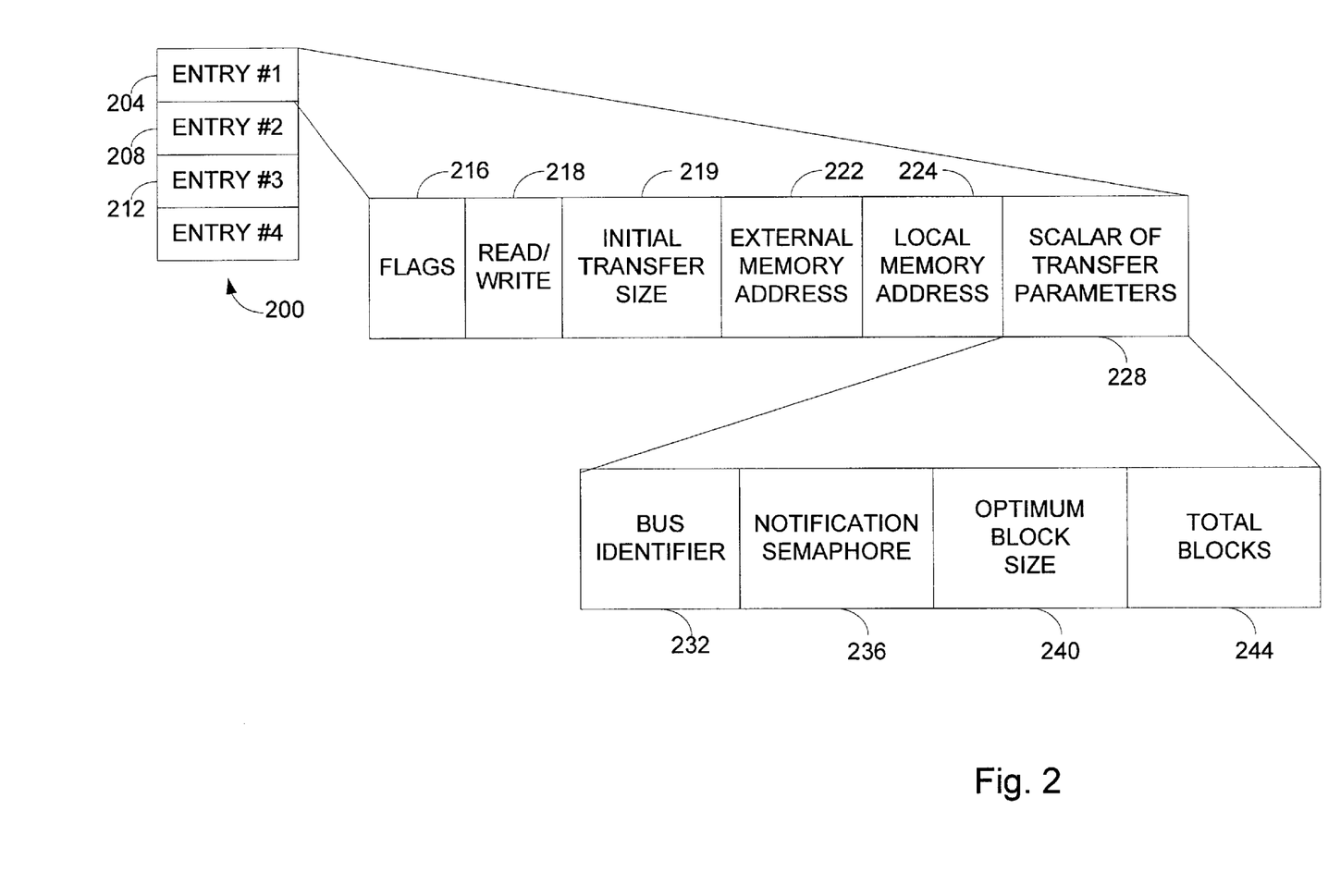
FIG. 2 shows an exploded view of a queue of data entries and the representative variables stored in each queue entry. external memory to local memory.

FIG. 2 shows an exploded view of a typical queue stored in the local memory of FIG. 1. Namely, queue 200 can be considered to represent a queue of entries which define the parameters for loading the code or data for an algorithm stored in external memory. These parameters, whether they represent a read or write between local memory and external memory shall be considered transfer parameters. A complete set of parameters necessary to accomplish such a transfer shall be known as a set of transfer parameters. As an example, assume that Queue #1 in FIG. 1 is the queue for the DCT algorithm 112 of FIG. 1. Hence, Queue #I would contain entries that allow the initial DCT algorithm blocks to be loaded into local memories 106 and 108 (depending on whether an algorithm block contained code or data, respectively).

In the queue 200 of FIG. 2, several queue entries are shown, namely queue entries 204, 208 and 212. Each queue entry is made up of various data elements that define how the algorithm blocks are to be transferred from external memory to the local memory of the processor. Typical queue entry 204 is comprised of a "Flag" field 216, a "Read/Write" field 218 that defines whether a read or write is made to memory; an "Initial Transfer Size" 219 that defines the size of the first block of data to be transferred;

an "External Memory Address" 222 that defines where the algorithm block is stored; a "Local Memory Address" 224 that defines the address in local memory where the algorithm block is stored; and an entry of transfer parameters 228.

The entry of transfer parameters is shown in an exploded view as well in FIG. 2. Namely, the entry of transfer parameters 228 is comprised of a "Bus Identifier" 232 that defines which bus should be utilized to transfer the algorithm block from external memory to local memory. Preferably, this is a two bit value that allows up to four busses to be identified. For example, assume that two busses exist in FIG. 1 to pass an algorithm block from external memory to local memory. A two bit value for "Bus Identifier" would allow at least the options: 1) Main Bus; 2) Secondary Bus; or 3) Main Bus with Priority. Hence, under this third option, a software-defined priority aspect could be added to the loading of the local memory. The next value in the entry of transfer parameters 228 is the "Notification Semaphore" 236. The "Notification Semaphore" is utilized to designate the pending/completed status of a particular transfer. If there is a small set of semaphores, it can be useful to assign semaphores to transfers of specific slots. Hence, when a block of code is about to be or is being loaded into SLOT 1 of local memory 106, the Notification Semaphore can be utilized to revise the global semaphore housed in register R31. In this way, register R31 is updated to reflect that SLOT 1 in local memory 106 is no longer available for loading of new code. Rather, one must wait until the code in SLOT 1 is executed before new code can be stored in SLOT 1. The Entry of Transfer Parameters 228 is also made up of an "Optimum Block Size" 240 value. The "Optimum Block Size" 240 value defines the preferred block size that is to be used in transferring data blocks from external memory 110 to local memory of the processor. The algorithms of external memory 110 split into subunits (e.g., DCT1, DCT2, . . . DCT4) that preferably do not exceed the size of a slot. At queuing time, the subunit size is converted to units of the "Optimum Block Size." As an example, suppose that the DCT1 has a size of 968 bytes and the "Optimum Block Size" is 256. Thus, this breaks down to 960=(3×256)+200, i.e., three optimum transfers of 256 bytes and one transfer of 200 bytes. Finally, the "Total Blocks" 244 value is shown as a further element of the entry of transfer parameters 228. "Total Blocks" defines the total number of transfers to take place from external memory to local memory (or from local memory to external memory when a "Write" is indicated).

Figure 3A:
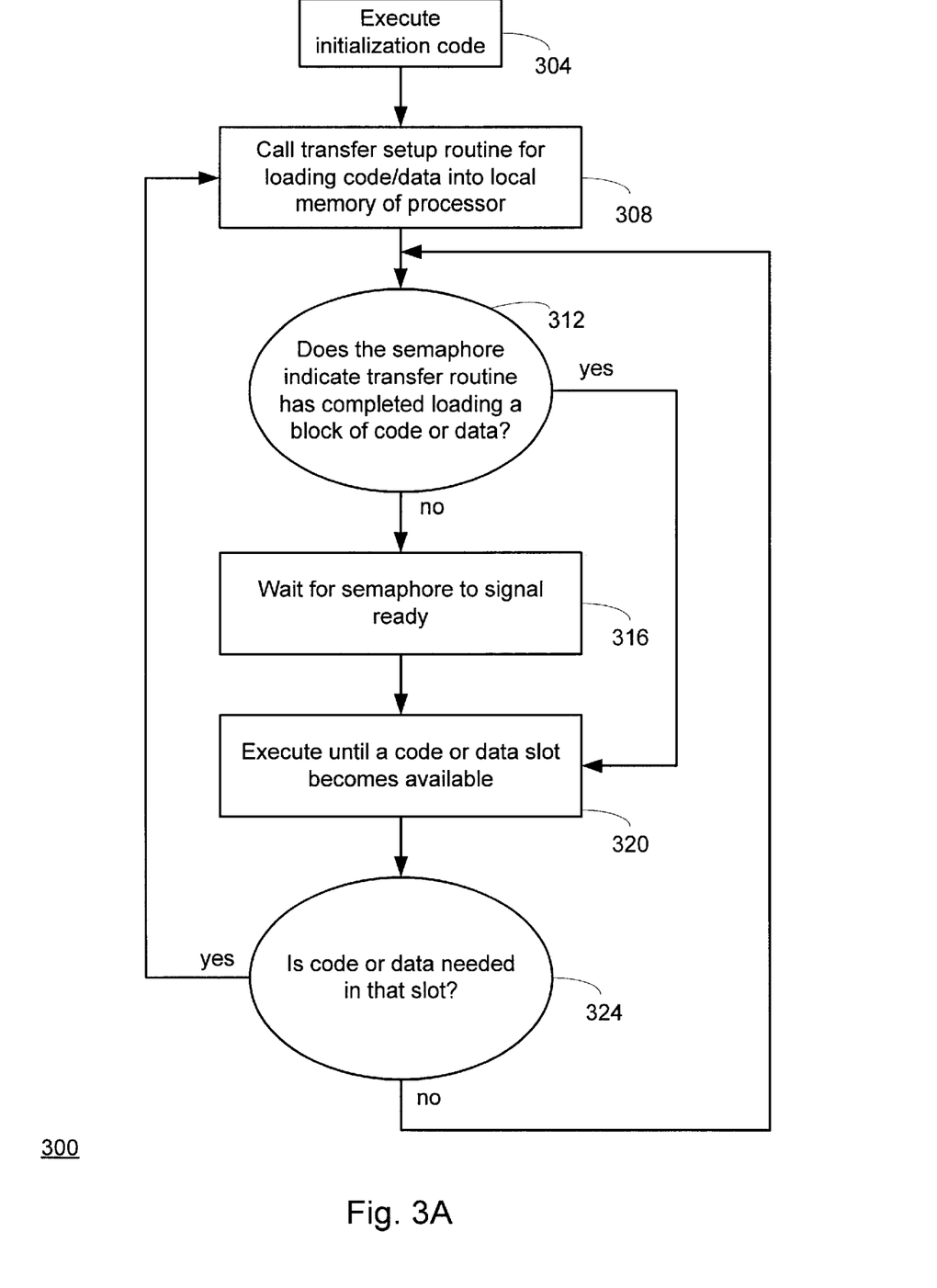
Figure 3B:
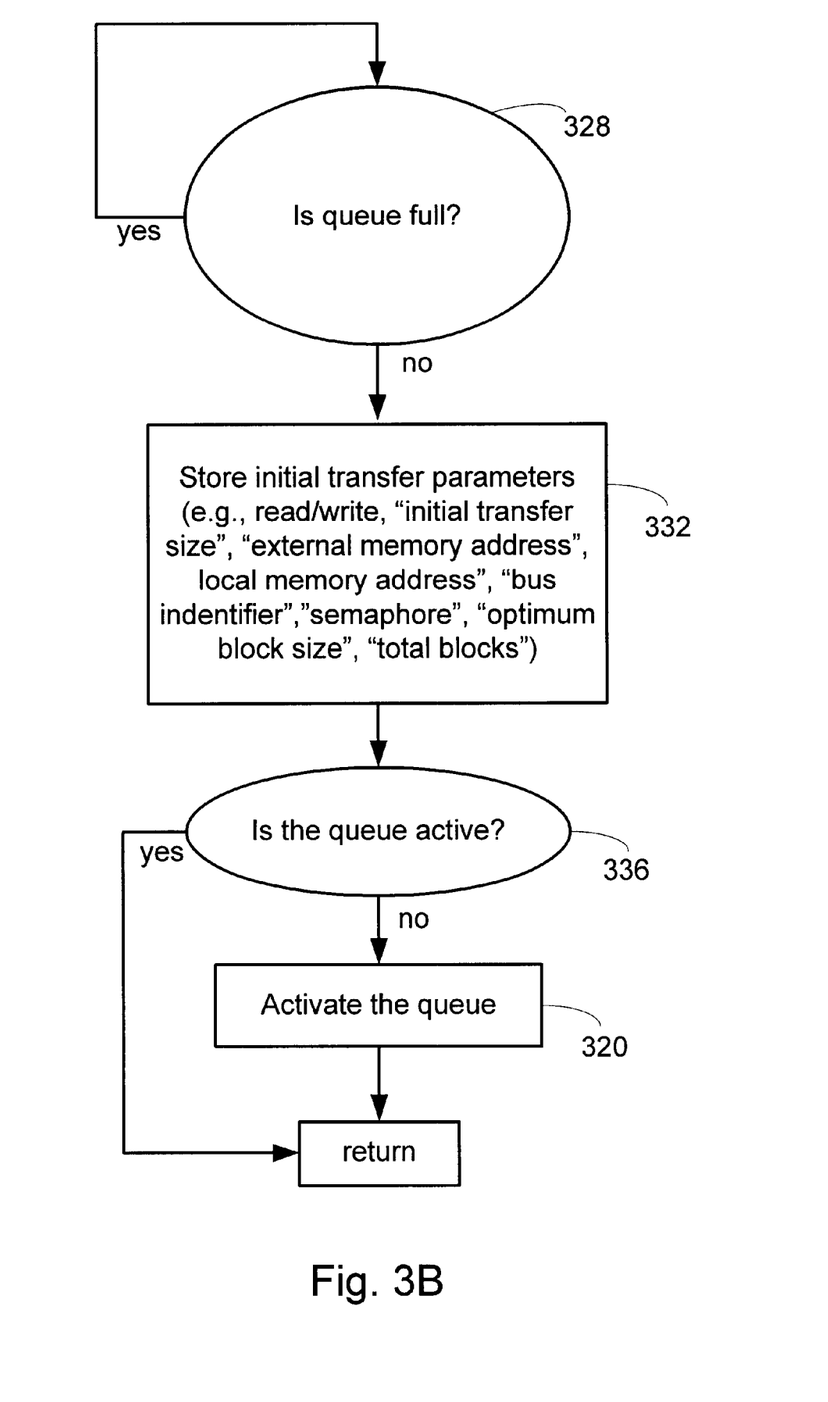
Figure 3C:
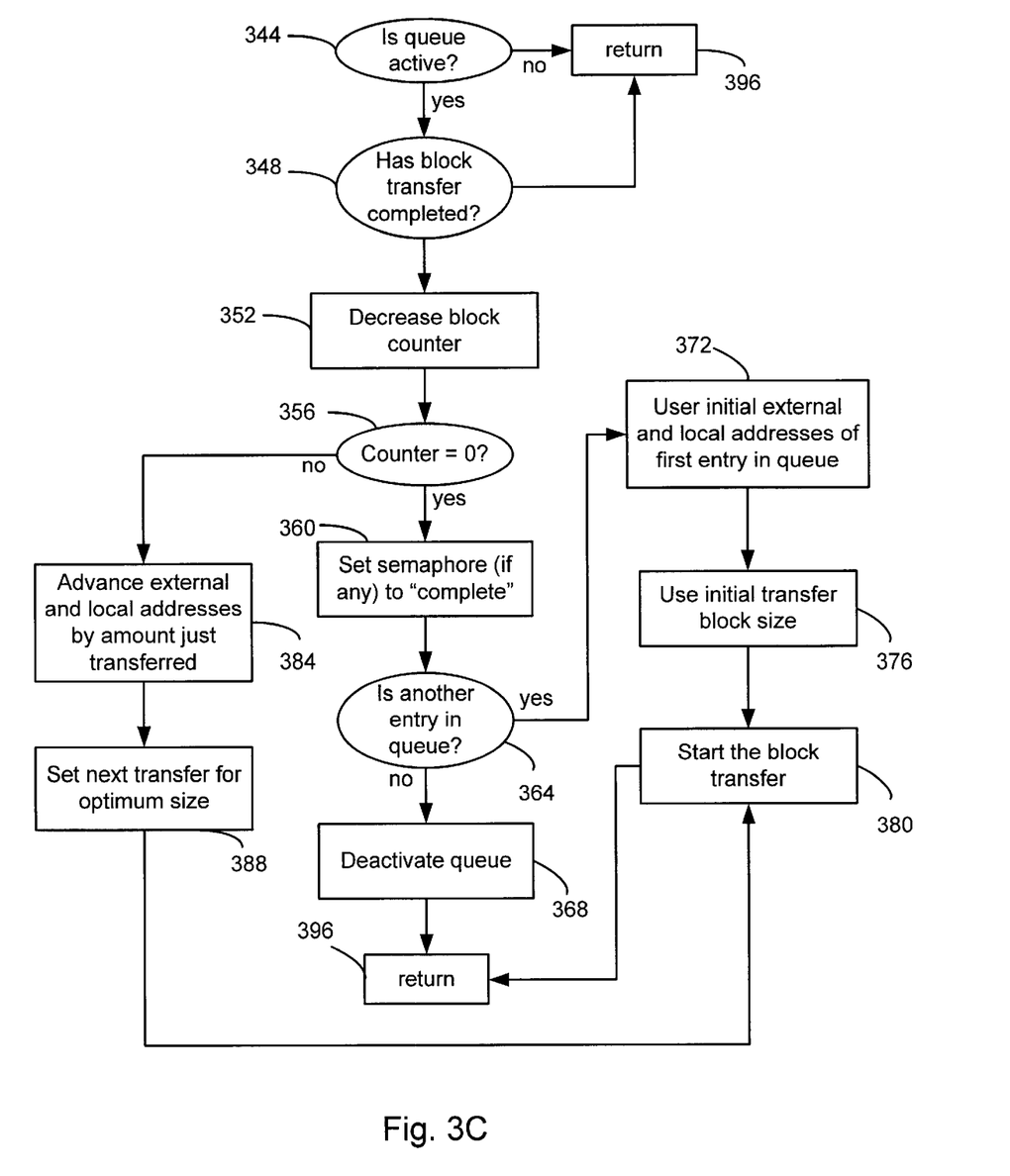

FIGS. 3*a*, 3*b*, and 3*c* are representative of a method 300 for implementing an embodiment of the invention. FIG. 3*a* illustrates a system that relies on the methods illustrated in FIGS. 3*b* and 3*c* to transfer data from external memory to local memory. Thus, the program in 3*a* is operable to load a local memory of a processor with, for example, audio processing routines; begin implementation of those routines; and, call a data transfer routine that loads additional audio processing routines into local memory.

In block 304, a processor executes initialization code that stores resident code for implementing transfer subroutines, as well as a queue that indicates the data processing routines to be loaded into local memory, e.g., DCT, FFT, Echo, AC-3, etc. In block 308, a transfer setup routine for loading code or data into local memory of a processor is called to load a first block of code into a slot of local memory. This process of actually implementing a transfer is illustrated by FIGS. 3*b* and 3*c*. The input to the transfer setup routine is an entry from the queue in local memory that contains parameters defining a block of code or data stored in external memory.

In block 312, the program determines whether a block of code or data has successfully been loaded into local memory. This is accomplished by checking the semaphore associated with the slot location for that block of code or data. Thus, if a slot of local memory is associated with bit 30 in register R31, the processor can check the value of bit 30 to determine whether it is ready to be implemented. If the block of code or data has been successfully loaded, then the processor can execute the loaded program, e.g., an audio processing code such as DCT or FFT. If the semaphore for the block of code has not been successfully loaded, then as shown by block 316, the program waits for the semaphore to signal the block is ready. In block 320, code is executed by the processor (e.g. the audio processing code) until another slot of local memory becomes available. Thus, for example, as the processor finishes executing the block of code for DCT-3 located in slot 2, the semaphore for slot 2 can be used to signal that slot 2 is available for a new block of code or data. Then, in block 324, a queue of pending transfers is checked to see if any code or data is destined for the available slot of local memory. If the slot is not needed, then the processor can continue to process the code or data stored in the local memory, e.g., DCT-4 which might be stored in slot 3. However, if one of the pending transfers in the queue does require that slot, then the program can loop back to block 308 and call the data transfer routine to transfer another block of code or data from external memory to the available slot in local memory. The processor thus interleaves its operations between invoking the data transfer hardware to transfer a new block of data or code to local memory and actually implementing code or data stored in local memory, e.g., implementing an audio processing routine.

FIG. 3*b* illustrates block 308 of FIG. 3*a* in more detail. The routine in FIG. 3*b* passes parameters to a transfer hardware routine, such as Direct Memory Access (DMA) hardware that facilitates the transfer of data or code to the local memory of the processor. Thus, the processor can continue to process the code or data stored in its local memory while the DMA hardware actually loads new code or data into available slots of local memory. The routine in FIG. 3*b* communicates the parameters necessary for the DMA hardware to accomplish this task.

As part of the transfer process, the transfer hardware routine maintains a queue of entries that direct what transfers are to be made. Thus, when the routine of FIG. 3*b* is implemented, it checks whether this queue is full 328. If the queue is full, the routine waits until the queue is no longer full. In block 332, the routine stores transfer parameters received from the main program in the queue of the transfer hardware routine. Thus, it can store transfer parameters, such as Read/Write, "Initial Transfer Size", "External Memory Address" "Local Memory Address" and "Bus Identifier" as well as "Semaphore", "Optimum Block Size" and "Total Blocks" in the queue of the hardware transfer routine. If a semaphore is defined, this is a good place to set it to the "not done" state. In block 336, a determination is made as to whether the queue for the hardware transfer is active. If it is active, the routine of FIG. 3*b* can return to the routine of FIG. 3*a* to continue processing, leaving the hardware transfer routine of FIG. 3*c* to process the transfer via DMA hardware, for example. If the hardware transfer queue is inactive, it is first activated in block 340.

FIG. 3*c* illustrates a routine for controlling transfer hardware, e.g., DMA hardware. If the CPU supports DMA interrupts, it is efficient to code the routine in FIG. 3*c* as an interrupt service routine. If the CPU does not support DMA interrupts, then the routine in FIG. 3*c* can be implemented as a subroutine that is called frequently. In particular, calls to the routine in FIG. 3*b* would occur in blocks 312 and 320 of FIG. 3*a* and in block 328 in FIG. 3*b*. In block 344, the queue's active status is checked to determine that the DMA hardware is running and that its associated queue or queues are nonempty. (Block 340 of FIG. 3*b* handles activation of an inactive queue.) If the queue is inactive 344 or is still busy 348, then the routine in FIG. 3*c* returns to its caller because there is nothing to do. Note that CPU-supported DMA interrupts allow hardware to perform the functions of blocks 344 and 348—the routine in FIG. 3*c* is called automatically when the queue is active and the previous block transfer has completed. Once the transfer has completed, the value of "Total Blocks" is decreased by one 352. A determination is then made in 356 as to whether "Total Blocks" equals zero. If "Total Blocks" does not equal zero, then the external and local addresses are advanced by the amount of data just transferred 384. Then the transfer size is set to the value of the "Optimum Block Size" or the amount of remaining data if it is less than the optimum amount 388 and another block transfer is initiated in 380. If "Total Blocks" was equal to zero in 356, then it is necessary to terminate the previous queue entry. If the completed queue entry was associated with a semaphore, then that semaphore should set to indicate that the entire transfer is complete 360. Then the routine checks to see if there is a remaining queue entry 364. If another entry exists, a new block transfer is set up using the initial external and local addresses 372 and the initial transfer size 376. If the new entry defines a semaphore, 9/28/00 RG then that semaphore should be set to "not complete" before calling 3*b*, Then this block transfer is initiated in DMA hardware 380. If block 364 determined that no more entries are in the queue, then the queue should be deactivated 368. If the CPU supports DMA interrupts, queue deactivation is equivalent to locking out DMA interrupts.

With some extra coding, FIG. 3c can be modified to support extra subqueues such as a priority queue. In hardware terms, there is one implementation of FIG. 3c for each DMA bus that the CPU supports. Software can allow a priority queue or queues to coexist with a DMA bus's standard queue by adding some code to block 364. Instead of checking only the standard queue for another entry, the code would check the priority queue first. Then code can decide whether block 372 is executed using the priority queue entry or the standard entry.

This "Notification Semaphore" parameter value can be "ORed" with the contents of a register which acts as the global semaphore by holding all semaphore values for the slots in use. For example, register R31 in FIG. 1 is shown as a memory location for keeping track of which slots in local memories 106 and 108 are occupied. Since nine slots are in use by the processor, 9 bit locations in R31 can be assigned. When a slot is occupied by code or data, a corresponding bit value in the 31 bit register R31 is set to 1. Thus, by knowing the relationship between slot locations and bit locations in R31, one can determine which slots are available by checking the value of R31. Consequently, when the transfer of the algorithm code to local memory is complete, the "Notification Semaphore" is ORed with R31 in order to affirmatively set the bit that corresponds with the slot where the code has been loaded into local memory.

The processor is then able to check the semaphore in register R31 to confirm that code has been loaded into a slot and then execute that code. If this bit style implementation is used, the following meanings for 0 and 1 can be used:

For code:
0=a code transfer is enqueued but is not fully transferred to its destination slot
1=the code is resident in the slot and is available for execution For data:
0=a data transfer is pending for a slot. Do not use the CPU to write to that area. If you know that the transfer is from local to external memory, it is safe to read via the CPU
1=no transfers are pending.

Because of these somewhat different behaviors, it is useful to initialize code semaphores to 0's and data semaphores to 1.

Figure 4:
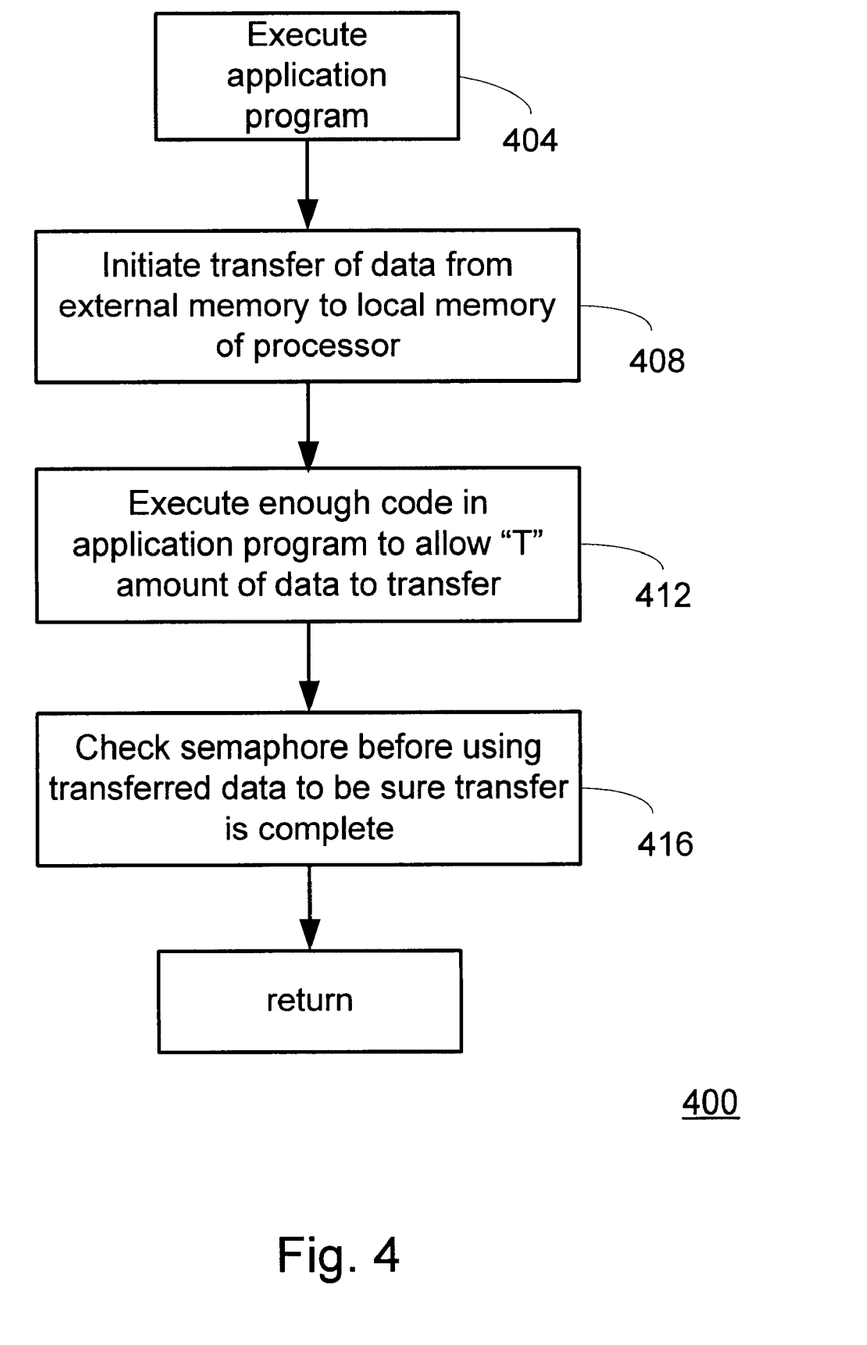
FIG. 4 shows a flow diagram illustrating the use of a semaphore to determine when a transfer of code from external memory to local memory has been completed.

One embodiment of the invention is useful in that it facilitates the loading of a local memory of a processor with code while executing other code already in that local processor. The processor utilizes execution units to execute code stored in its local memory and transferred to its execution units across an internal bus. The processor also utilizes an external bus to transfer data/code between the external memory and the internal memory. Hence, while the processor executes the resident code it can also load new code from external memory. The challenge is to continuously have new code available for execution. One aspect of this challenge is knowing when to initiate a transfer of code from external memory to local memory so that the newly loaded code or data will be available when needed. FIG. 4 shows a method 400 for implementing this aspect of the invention.

In FIG. 4, an application program is executed 404. Then, a transfer of data from external memory to local memory is initiated 408. Next, the application program is executed for a period long enough such that the data transfer can be completed 412. Of course, it is possible that the application does not have enough useful things to do during the transfer or that the transfer is delayed by bus arbitration. This could result in idle time spent waiting for the semaphore. Still, in most cases, idling can be nearly eliminated. Finally, the semaphore, e.g., in register R31 is checked before using the transferred data in order to ensure that the transfer is complete 416. The semaphore should be checked the first time code from the newly loaded slot is about to be executed. For example, if code in slot 0 calls a number of subroutines in slot 1, then it is only necessary to validate the semaphore before the first subroutine is called. The semaphore state remains valid for later subroutines in slot 1 until the semaphore is used for another transfer. Since this is under the programmer's control, it is easy to maintain the semaphore.

Figure 5:
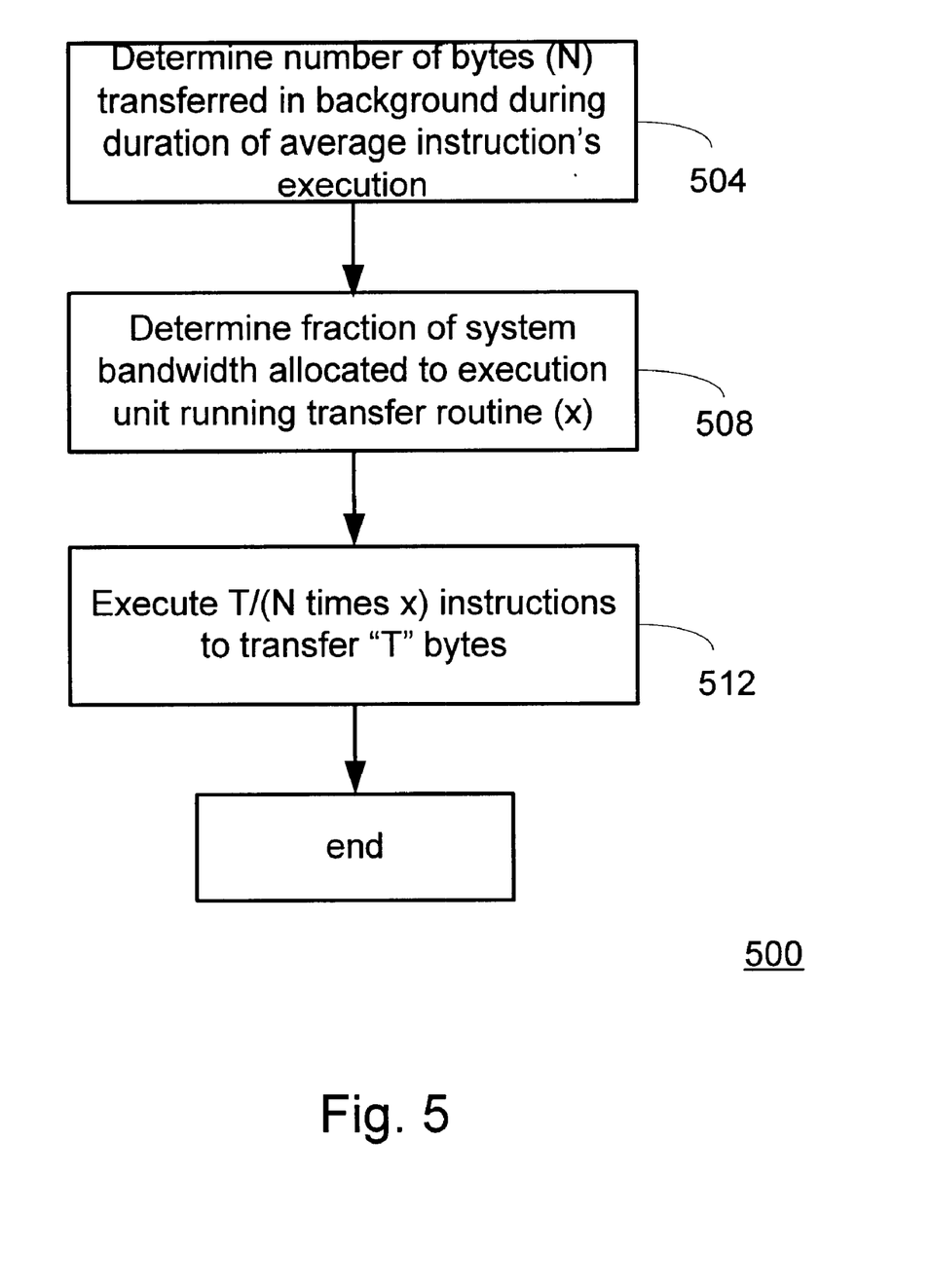
FIG. 5 shows a flow diagram for transferring data from external memory to internal memory of a processor in a proportional manner relative to the amount of code being executed by the processor.

FIG. 5 shows the technique that is used to determine how much of the application program that has already been transferred to local memory needs to be executed in order to ensure that the transfer of code/data from external memory to local memory is complete. Hence, it shows how many instructions will need to be completed by the processor in order to allow for a given amount of code/data to be transferred. Namely, method 500 in FIG. 5 determines the number of bytes (N) that are transferred between local memory and external memory during the duration of an average instruction's execution 504. Then, an estimate is made as to the runtime efficiency of the data transfer (x) 508. For example, in a full DVD decoding environment, other software and hardware operations might share the same data transfer facilities. This would yield less than 100% available to this process. Based on evaluation of bus arbitration, the expected efficiency can be calculated. Accordingly, to transfer a specific number of bytes (T) one should execute T divided by the product of N times X instructions.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

For related subject matter concerning this invention, reference is made to U.S. patent applications Ser. No. 09/678,898 entitled "Method and Apparatus for Processing Data with Semaphores" and U.S. Ser. No. 09/678,857, entitled "Multi-Component Processor," filed concurrently herewith, which is hereby incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method comprising:

implementing an application program;

initiating a transfer of data from an external memory to a processor by invoking a transfer subroutine operable on said processor;

executing a portion of said application program; and determining that said data has been transferred from said external memory utilizing a proportional relationship between said application program speed and said transfer of data speed.

2. The method of claim 1, wherein said determining that said data has been transferred comprises:

determining how much code of said application program has been executed.

3. The method of claim 1, and further comprising:

checking a semaphore for said data transfer to confirm that said transfer is complete.

* * * * *